United States Patent
Rangarajan et al.

(10) Patent No.: US 9,009,103 B2
(45) Date of Patent: Apr. 14, 2015

(54) FINGERPRINT-BASED, INTELLIGENT, CONTENT PRE-FETCHING

(71) Applicant: Microsoft Corporation, Redmond, WA (US)

(72) Inventors: Sandeep Rangarajan, Seattle, WA (US); Yogesh Sreenivasan, Redmond, WA (US); Shai Guday, Redmond, WA (US); Bama Ramarathnam, Clyde Hill, WA (US)

(73) Assignee: Microsoft Technology Licensing, LLC

( * ) Notice: Subject to any disclaimer, the term of this patent is extended or adjusted under 35 U.S.C. 154(b) by 176 days.

(21) Appl. No.: 13/832,342

(22) Filed: Mar. 15, 2013

(65) Prior Publication Data

US 2014/0279851 A1   Sep. 18, 2014

(51) Int. Cl.
 *G06F 17/30* (2006.01)
 *H04L 29/08* (2006.01)

(52) U.S. Cl.
 CPC ...... *G06F 17/3048* (2013.01); *G06F 17/30902* (2013.01); *H04L 67/04* (2013.01)

(58) Field of Classification Search
 CPC .................. G06F 17/30; G06F 17/30902
 USPC .............................. 707/609; 711/133; 709/213
 See application file for complete search history.

(56) References Cited

U.S. PATENT DOCUMENTS

| | | | |
|---|---|---|---|
| 6,085,226 A | 7/2000 | Horvitz | |
| 6,182,133 B1 | 1/2001 | Horvitz | |
| 6,701,316 B1 * | 3/2004 | Li et al. | 370/395.41 |
| 6,766,422 B2 * | 7/2004 | Beyda | 711/137 |
| 7,047,485 B1 | 5/2006 | Klein et al. | |
| 8,539,161 B2 * | 9/2013 | Lu et al. | 711/133 |

(Continued)

FOREIGN PATENT DOCUMENTS

EP    1653381 A2   5/2006

OTHER PUBLICATIONS

Komninos, Andreas., "Personal Predictive Internet Content Pre-caching for Mobile Devices", Retrieved at <<http://citeseerx.ist.psu.edu/viewdoc/download?doi=10.1.1.133.6621&rep=rep1&type=pdf>>, In a Thesis Presented for the Fulfilment of the Requirements for the Degree of Doctor of Philosophy, Retrieved Date: Feb. 12, 2013, pp. 202.

(Continued)

*Primary Examiner* — Jean M Corrielus
(74) *Attorney, Agent, or Firm* — Timothy Churna; John Jordine; Micky Minhas

(57) ABSTRACT

Example apparatus and methods concern fingerprint-based, intelligent, content pre-fetching. An example apparatus may have a memory that is configured to store content items or fingerprints derived from content items. The apparatus may include a set of logics that are configured to selectively asynchronously provide a content item or a fingerprint derived from the content item to a data store on a mobile computing device. The items are provided in response to an event other than a request for content from the mobile computing device. The apparatus may be configured to select the content item based on a proactive, crowd-sourced, predictive and adaptive method. The apparatus may provide the content item or the fingerprint to the mobile device and to other related mobile devices or users. The apparatus may consider the state (e.g., available memory, available battery, available communication channels) of the mobile device before providing content.

20 Claims, 9 Drawing Sheets

(56) References Cited

U.S. PATENT DOCUMENTS

| | | | |
|---|---|---|---|
| 2005/0117558 A1 | 6/2005 | Angermann et al. | |
| 2011/0063317 A1 | 3/2011 | Gharaat et al. | |
| 2012/0233701 A1* | 9/2012 | Kidron | 726/26 |
| 2012/0246257 A1* | 9/2012 | Brown | 709/213 |

OTHER PUBLICATIONS

Lymberopoulos, et al., "PocketWeb: Instant Web Browsing for Mobile Devices", Retrieved at <<http://homes.cs.washington.edu/~kstrauss/publications/asplos254-lymberopoulos.pdf>>, In Seventeenth International Conference on Architectural Support for Programming Languages and Operating Systems, Mar. 3, 2012, pp. 12.

Sulaiman, et al., "Rough Set Granularity in Mobile Web Pre-Caching", Retrieved at <<http://eprints.usm.my/24980/1/Rough_Set_Granularity_in_Mobile_Web_Pre-Caching.pdf>>, In Eighth International Conference on Intelligent Systems Design and Applications, Nov. 26, 2008, p. 6.

Jin, et al., "An Integrated Prefetching and Caching Scheme for Mobile Web Caching System", Retrieved at <<http://ieeexplore.ieee.org/stamp/stamp.jsp?tp=&arnumber=4287740>>, In Eighth ACIS International Conference on Software Engineering, Artificial Intelligence, Networking, and Parallel/Distributed Computing, Jul. 30, 2007, p. 6.

"International Search Report & Written Opinion for PCT Patent Application No. PCT/US2014/025194", Mailed Date: Nov. 17, 2014, 12 Pages.

* cited by examiner

FINGERPRINT-BASED, INTELLIGENT, CONTENT PRE-FETCHING

BACKGROUND

Mobile device users access content. The content may be located in different locations and may be available via different paths and thus may cost different amounts of money to access, may take different amounts of time to retrieve, and may consume different amounts of power. Attempts that have been made to improve users' browsing experiences include, among other things, pre-fetching content to a mobile device, parallelizing requests, and compressing images and web objects. These conventional attempts to improve users' browsing experiences tend to revolve around a user making a request and then waiting for the responses to go through their natural course of synchronously connecting and pulling content from a server.

Conventional pre-fetching may include acquiring the most popular content at a point in time or the content that a user most frequently accesses. This conventional pre-fetching may occur in response to a user making a request for content and may involve pushing the predictively acquired content all the way to the user's mobile device. However, mobile devices have limited memory, thus conventional pushing of content all the way to the device may be disrespectful of that limited memory. Additionally, pushing content all the way to the device may be expensive, may incur battery drain, or may consume an undesired amount of a user's data plan. Furthermore, even if content has been pushed all the way to a user's mobile device, it may be difficult for the mobile device to identify what content has been provided.

Conventional pre-fetching is typically user-centric. For example, if a user visits their favorite website every day, then content from that website may be pre-fetched to the user device. Additionally, all content available from the visited website may be speculatively pre-fetched. While a user may visit a website every day, and while a user may occasionally click through to additional content, the user may only be interested in certain content available at or through that website. Conventional pre-fetching may not operate so precisely and thus may provide information that will never be viewed by the user. Habitually providing content that is never viewed, while habitually not providing follow-on content that is viewed, may not improve a user's browsing experience and may cost the user both time and money.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods improve mobile users' browsing or web application performance when accessing internet resources. Adaptive asynchronous refresh is used to intelligently pre-fetch content selected by predictive approaches. Asynchronous refresh occurs in response to an event other than a request for content from the mobile user. The intelligence may be based on a mobile user's history, patterns, location, or other factors. Additionally, the intelligence may be based on the history, patterns, locations, or other attributes associated with other users that can be correlated with this user. For example, the history, patterns, and other attributes of family members, co-workers, social networking circles, and similarly situated users may be considered.

Example apparatus and methods concern fingerprint-based, intelligent, content pre-fetching. An example apparatus may have a memory that is configured to store content items and fingerprints derived from content items. The apparatus may include a set of logics that are configured to selectively asynchronously provide a content item or a fingerprint derived from the content item to a data store on a mobile computing device. The items may be provided in response to an event other than a request for content from the mobile computing device. The apparatus may be configured to select the content item based on a proactive, crowd-sourced, predictive, and adaptive method. The apparatus may provide the content item or the fingerprint to the mobile device and to other related mobile devices or users. The apparatus may consider the state of the mobile device (e.g., available memory, available battery, communication channels available for communicating with the mobile device) before providing content or fingerprints.

The fingerprint may be, for example, a hash of a URL (uniform resource locator) of an accessed website or other obfuscation of an identifier of the content item. A fingerprint may be generated for content that is retrieved by or provided to a mobile device. The fingerprint may be stored in a local fingerprint database on the mobile device and may also be shared with a remote fingerprint database in a web service. The web service may then use the fingerprint to predictively pre-fetch content for the mobile device. Since the web service may be receiving fingerprints from more than one mobile device, the web service may also inform mobile devices of the content that is available on the web service by providing the corresponding fingerprints. Since the fingerprint is obfuscated and anonymous, privacy is maintained for users of the web service.

Example apparatus and methods may share intelligence through a proxy service on a device. The proxy service participates in content pre-fetching that may be proactive, crowd-sourced, and predictive. As an example of being proactive, content that is pre-fetched and subsequently viewed may be pre-fetched again in the future while content that is pre-fetched and not viewed may not be pre-fetched in the future. As an example of being crowd-sourced, content that is accessed by members of a user's social network may be pre-fetched. As an example of being predictive, content that may logically follow viewed content may be accessed. For example, a web page may include four links to other articles. Based on a user's habits or history, one of the links may be selected as being likely to be viewed by this user at this time. Therefore, that content available through that link may be pre-fetched while content available through other links is not pre-fetched. A mobile user may interact with more than one device. Thus, content that is pre-fetched for a mobile device may also be distributed or otherwise made available to other devices with which the user may interact. Additionally, a mobile user may interact with a set of other users. Thus, content that is pre-fetched for one member of the set of users may also be distributed or otherwise made available to other users with which the user may interact.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
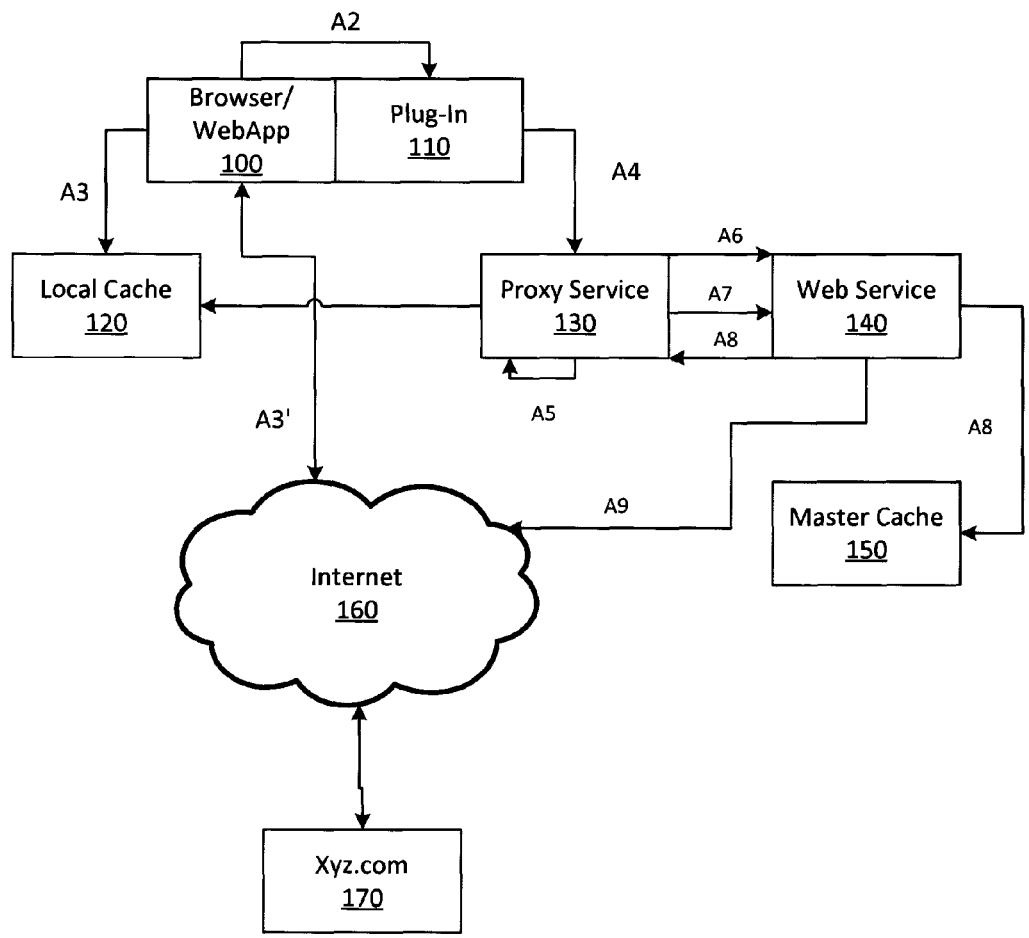
FIG. 1 illustrates an example data flow associated with fingerprint-based, intelligent, content pre-fetching.

Example apparatus and methods perform fingerprint-based, intelligent, content pre-fetching. Content displayed on a mobile device can come from the mobile device, from a web service, from an origin server, from a nearby device or from another location. The content can come to the mobile device in response to a request from the mobile device, in response to predictive work by the web service or by an application on the mobile device, in response to targeting work from a target service (e.g., ads), or from other locations. Intelligently and strategically placing and pre-placing content facilitates improving a user's mobile device browsing experience without mindlessly increasing the user's cost or thoughtlessly consuming the user's finite resources.

When a mobile device requests content, the content may already be on the device or a nearby device, may be available at a web service that supports the mobile device, or may be available from an origin server. The mobile device uses fingerprints to determine from where the content will be retrieved (e.g., locally, from service, from origin). Using the fingerprint, rather than having to examine actual content, facilitates reducing the burden on local memory to store content and facilitates reducing the burden on a local processor to search that content. When a mobile device receives content, it may compute a fingerprint for the content and update its fingerprint database. The mobile device may also provide metadata (e.g., fingerprint) or content to the web service so that the web service can update its fingerprint or content databases. The mobile device or the web service can also provide metadata (e.g., fingerprint) or content to other devices or users to update their fingerprint or content databases.

Receiving content can trigger the web service to pre-fetch additional content into the web service or onto the mobile device. Other actions can also trigger the web service to pre-fetch additional content into the web service or onto the mobile device. Receiving the content or other actions can also trigger other services (e.g., targeted advertising) to pre-fetch additional content into the web service or onto the mobile device. Rather than moving all the content to the mobile device, only fingerprints about the content may be moved to the mobile device. This saves money and bandwidth while still improving response time as compared to having to go to the origin server, especially if the web service can position the content one Wi-Fi communication from the mobile device (e.g., in computing device in a coffee shop that is handling Wi-Fi access for mobile device).

Much information about mobile devices and their users may voluntarily be made available by the users. For example, information concerning what a user does routinely, the location of a mobile device, what a user does routinely at that location, what time it is, what a user does routinely at that time, what anomalous things the user is currently doing, and other information may be known. Similarly, information concerning what other users do routinely, the locations of other mobile devices, what other users do routinely at those other locations, what time it is, what other users routinely do at this time, what other anomalous things users are currently doing, and other information may be known. This information can be used to predict what information a user of a mobile device may be interested in next or at some other point in time. The predictions can be used to pre-fetch that information. The pre-fetch can be done all the way to the mobile device, or can be done to a web service that is closer to the device than an origin server. The pre-fetch can be of content or of a fingerprint. The predictions and pre-fetching can be done asynchronously (e.g., without the user making a request for content). The predictions and pre-fetching can be done transparently, without the user even being aware that the actions are occurring.

Content that is received can be shared with other users or devices that are correlated to the mobile device that received the content. Predictive content may also be shared with other users or devices that are correlated to the mobile device for which the prediction was made. For example, other devices that are using a mobile device for Internet access may receive fingerprints or content and other devices used by the user of the mobile device (e.g., laptop, personal computer, smart phone, wearable computing devices such as glasses) may also receive the fingerprints or content. Additionally, members of a social network or other group to which a user of the mobile device belongs may receive fingerprints or content. Similarly, a user may receive fingerprints or content based on the actions of members of their social network or other group to which they belong.

FIG. 1 illustrates an example data flow associated with fingerprint-based, intelligent, content pre-fetching. While certain components, data flows, and requests are illustrated, other components, arrangements of components, requests, and data flows may be employed as would be understood by one skilled in the art. A browser 100 or other web application may send a hypertext transfer protocol (HTTP) request to xyz.com 170. Along A2 the browser 100 may notify a proxy plugin 110 of the top-level uniform resource locator (URL) associated with the request. The browser 100 may get the content along A3 from local cache 120 or along A3' from xyz.com 170. Xyz.com 170 may be referred to as an origin server. The proxy plugin 110 may compute the fingerprint and notify the proxy service 130 along A4. Along A5, the proxy service 130 may check its fingerprint database to determine whether there is updated content for the browser 100. If the content in the local cache 120 is up to date, the proxy service 130 sends a cache hit notification along A6 to the web service 140. The web service 140 may, for example, update a counter or take other actions in response to receiving the cache hit notification. If the content in the local cache 120 is not up to date, the proxy service 130 may send along A7 a separate request to the web service 140 to pre-fetch additional content associated with the fingerprint using a predictive approach. The web service 140 may, along A8, check its fingerprint database to determine whether master cache 150 has additional content associated with the fingerprint. If so, the web service 140 may pull content from the master cache 150 and send it to proxy service 130. Proxy service 130 may fingerprint the content and populate the local cache 120 for future use. If there is no additional content in the master cache 150, then the web service 140 may, along A9, acquire additional content from origin server 170, fingerprint the additional content, and cache the additional content in master cache 150. The additional content may also be sent to the proxy service 130, which will fingerprint the additional content and populate the local cache 120 for future use. If the browser 100 makes a subsequent request to xyz.com 170, the content will be readily available in its local cache 120.

Figure 9:
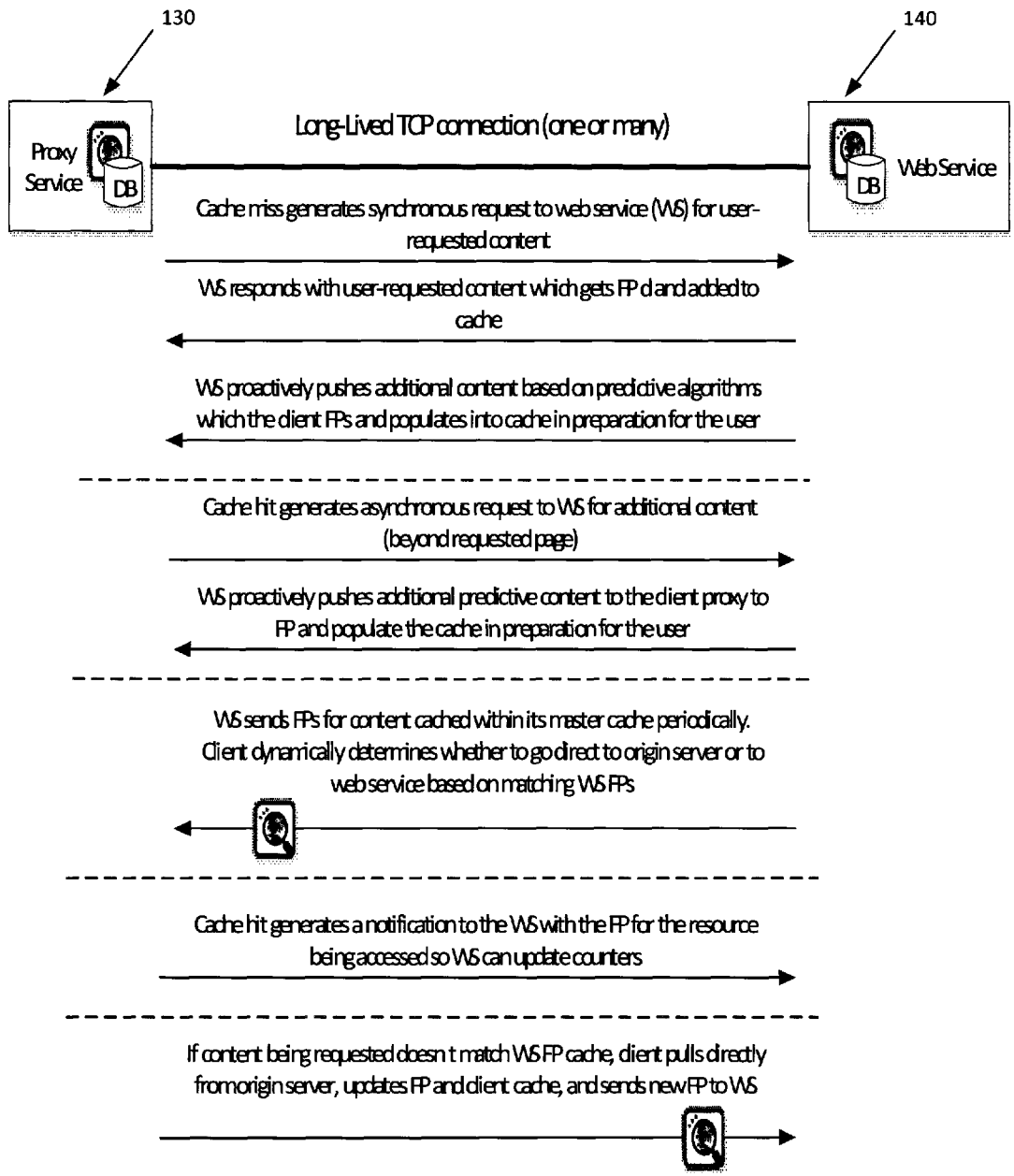
FIG. 9 illustrates example message flows between a proxy and a web service.

FIG. 9 illustrates some example message flows between a proxy (e.g., proxy service 130, FIG. 1) and a web service (e.g., web service 140, FIG. 1). Proxy service 130 is illustrated having a local database and web service 140 is also illustrated having a local database. The local databases may store fingerprints or content. While five message flows are illustrated, additional or different message flows may be employed.

Figure 2:
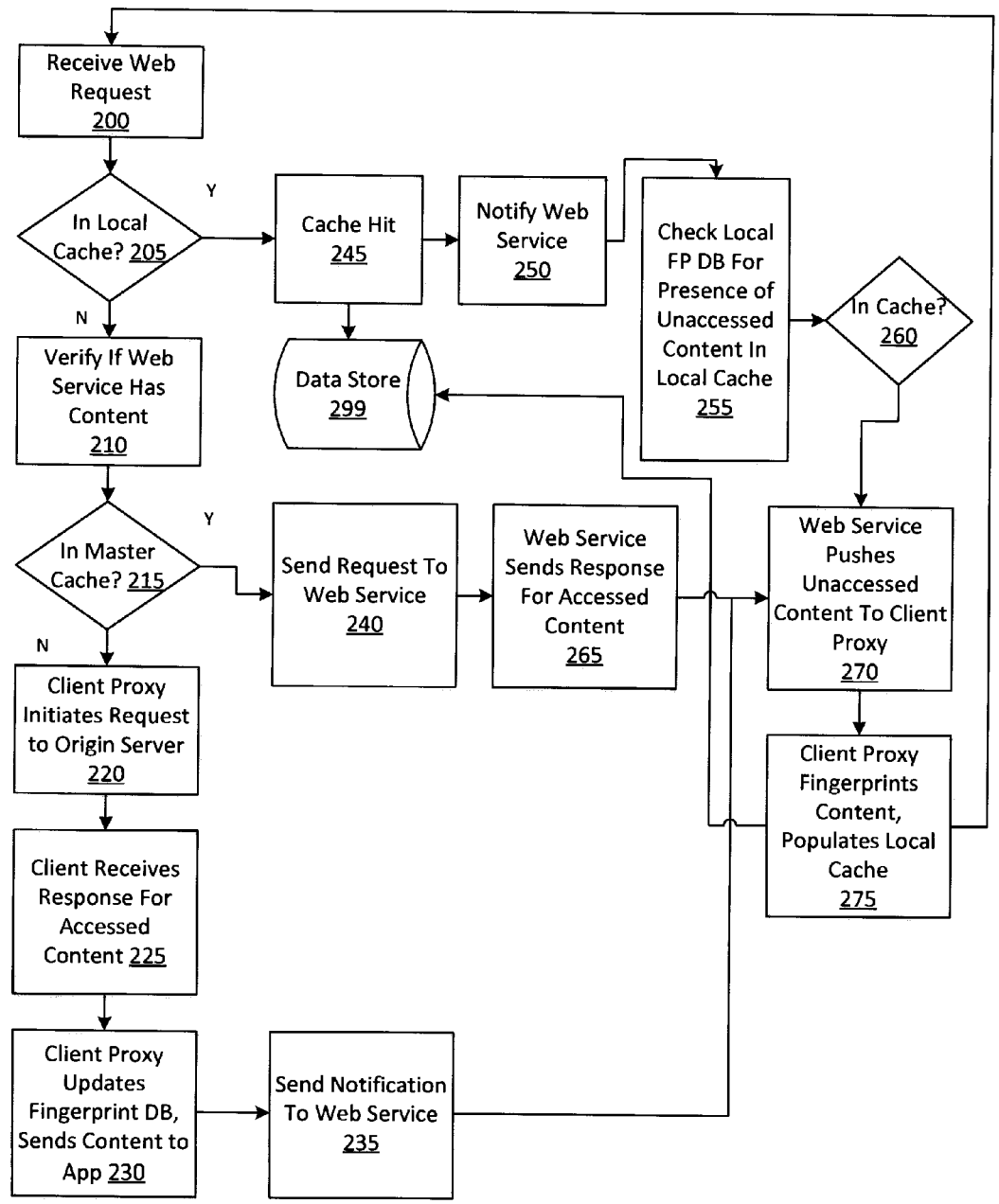
FIG. 2 illustrates an example flow associated with fingerprint-based, intelligent, content pre-fetching.

FIG. 2 illustrates an example flow associated with fingerprint-based, intelligent, content pre-fetching. FIG. 2 illustrates one example end-to-end flow of a web request and its lifecycle. A web request may be received at 200. At 205 a determination is made concerning whether the resource is available in a local cache associated with a web service. If the resource is available, then a cache hit occurs at 245 and the content is provided from the cache 299. At 250, a notification of the local cache hit may be sent to a web service. At 255, the web service may check its fingerprint database to determine whether un-accessed content is present in the cache 299. If the determination at 260 is yes, then at 270 the web service may push un-accessed content to the proxy and at 275 the proxy may fingerprint the content and populate its local cache. If the determination at 260 is no, then control may return to 200.

If the decision at 250 indicated a local cache miss, then at 215 a decision is made concerning whether the web service has the content. In one embodiment, the decision at 215 may be made after searching at 210 for a fingerprint in a local copy of the web service's fingerprint database. If the resource is in the master cache, then a request may be sent at 240 to the web service for the content and at 265 the web service may provide a response concerning the accessed content. The web service may then, at 270, push un-accessed content to the client proxy with processing continuing at 275.

If the decision at 215 is that the resource is not in the master cache, then at 220 the client proxy may initiate a request to an origin server for the content. At 225, the client may receive a response concerning the accessed content and at 230, the client proxy may update its fingerprint database and send the content to the application. At 235, a notification of the acquisition of the content from the origin server may be sent to the web service, with processing then continuing at 270 and 275. Different flows may be employed.

The flow illustrated in FIG. 2, the messages illustrated in FIG. 9, and the flow illustrated in FIG. 1, may be associated with one embodiment of a fingerprint-based, intelligent, content pre-fetching method. In this embodiment, a proxy service may be implemented on a mobile device as a separate application or service. The proxy may be built on existing hypertext transfer protocol (HTTP) libraries and may support, for example, hypertext markup language (HTML), dynamic HTML (DHTML), cascading style sheets (CSS), Java Script (JS) rendering, and other features. The proxy service may share a common local cache with a web application (e.g., browser). The proxy service may maintain an always-on connection to a web service that provides intelligent, fingerprint-based content pre-fetching for the mobile. The always-on connection may be used to share fingerprint intelligence and notifications between the proxy and the service.

The web service may proactively push fingerprint updates to the proxy service on a near real-time basis. The rate at which pushes are made may be controlled as described below. The pushes may be asynchronous and thus may not require an initiating action from the proxy or mobile. The client proxy may receive requests and be able to determine, using fingerprints, whether the content is in its local cache, whether it is available at a web service, or whether it needs to fetch the content from an origin server. Initially, fingerprints may be obfuscated hashes of URLs being requested. Over time, as the embodiment learns through crowd-sourcing, the fingerprints can evolve to become higher-level abstractions. Fingerprints are shared between the proxy and the web service, and potentially between other proxies as well so that clients have visibility into what content is populated in a master cache on the web service without having to query the web service.

Pre-fetching may be subject to user preferences, device intelligence, cloud heuristics, and other considerations. These may include, for example, user controllable slider settings, battery life, data plan characteristics, roaming, application access patterns, and other considerations. For example, for websites or applications that a user visits more than a threshold amount of times, content can be downloaded ahead of the user actually requesting the content. The content can be downloaded based on a user's local access patterns and preferences. For example, a user may prefer to receive a certain news page when they enter a coffee shop. Thus, as a user approaches that coffee shop, the news page may be pre-fetched. Additionally, when a user browses some content, then intelligence can be applied to identify links that the user is likely to click or content that the user is likely going to want to see next. These links and preferences may be based, for example, on crowd-sourced behavioral analysis.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic or other computing device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
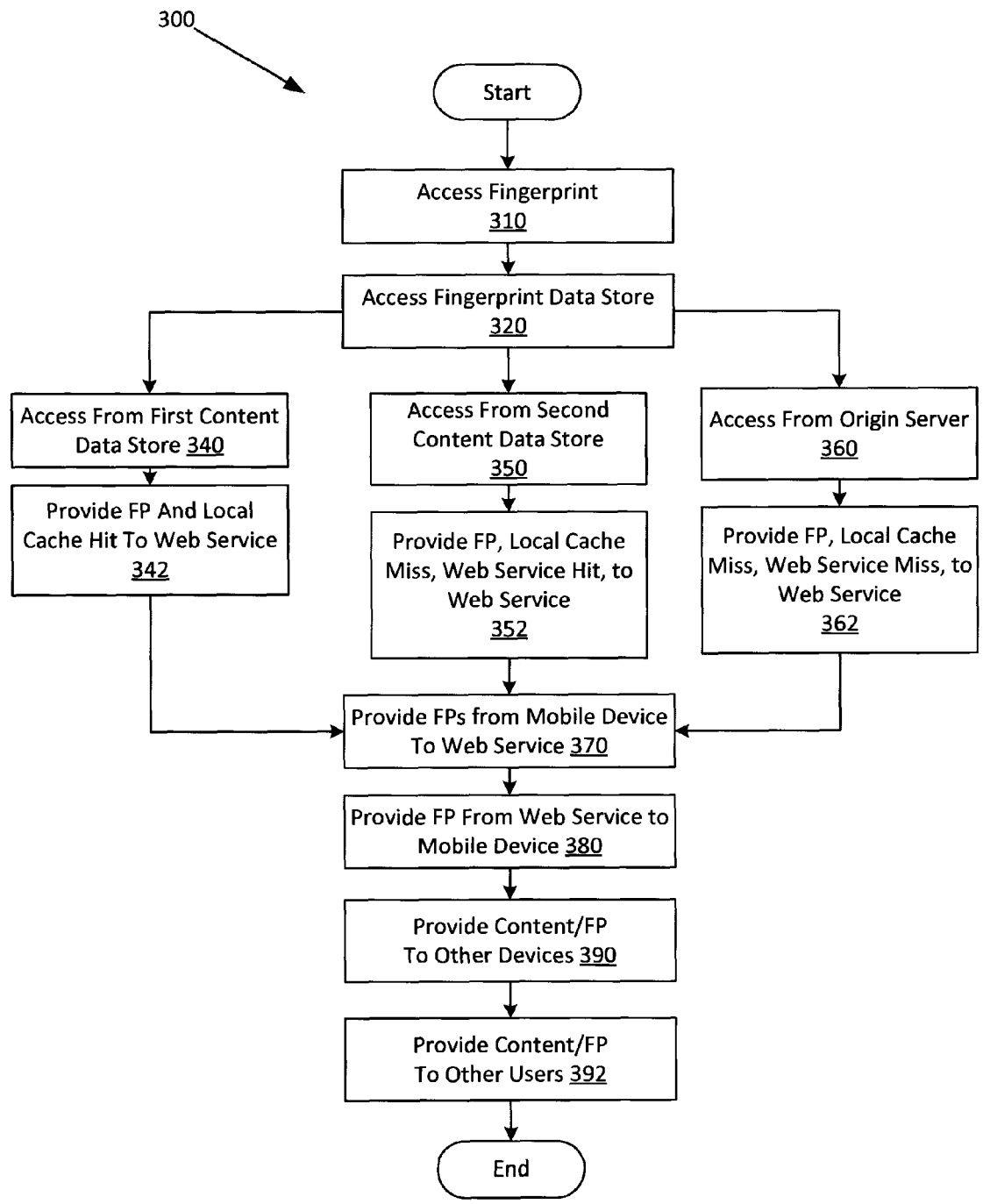
FIG. 3 illustrates an example method associated with fingerprint-based, intelligent, content pre-fetching.

FIG. 3 illustrates an example method 300 associated with fingerprint-based, intelligent, content pre-fetching. Method 300 includes, at 310, accessing a fingerprint for a content item to be accessed by a mobile computing device. The fingerprint may be, for example, an anonymous obfuscation of an identifier of the content item. In one embodiment, the fingerprint may be generated in response to a request from the mobile computing device for the content item. The fingerprint may take different forms and may be generated in different ways. In one embodiment, the fingerprint is a hash of a uniform resource locator (URL) associated with the content item, a universal resource identifier (URI) associated with the content item, a globally unique identifier (GUID) associated with the content item, a time to live associated with the content item, a size of the content item, an object type of the content item, a modification date of the content item, a creation date of the content item, or a language of the content item.

Method 300 also includes, at 320, accessing a fingerprint data store on the mobile computing device. The fingerprint data store may store fingerprints associated with content items available from a first content data store on the mobile computing device, from a second content data store associated with a web service that provides a content pre-fetching service for the mobile computing device, and from an origin server. In one embodiment, the fingerprint data store is periodically or asynchronously refreshed by the web service so that the fingerprint data store has accurate information concerning what content is available both locally and at a web service.

Method 300 also includes, at 330, identifying where the content item is available. The content item may be available on the mobile computing device, at the web service, or at an origin server. The content item may be identified as being available on the mobile computing device if the fingerprint is present in the fingerprint data store. The content item may be identified as being available at the web service if the fingerprint is present in a replica of the web service fingerprint database. The location of a content item may be determined by, for example, a field in a fingerprint record, a portion of a fingerprint database in which a fingerprint is stored, a hash of the fingerprint that yields a cache address, or in other ways.

Upon determining that the content item is available from the first content data store, method 300 proceeds, at 340, by accessing the content item from the first content data store, and, at 342, by providing the fingerprint and a notification of a local hit to the web service. When content is found locally, the web service may be informed to update an access time or access count for the content. Updating the access time or access count may inform a decision by the web service concerning whether to retain the content in its cache. Updating the access time or access count may also inform future decisions by the web service concerning pre-fetching that content.

Upon determining that the content item is not available on the mobile device from the first content data store, and upon determining that the content item is available from the second content data store associated with the web service, method 300 proceeds, at 350, by accessing the content item from the second content data store. Recall that the second content data store is associated with the web service. The second content store may be, for example, a database that is accessible to the web service. Method 300 then proceeds, at 352, by providing the fingerprint to the web service and, at 354, by providing a notification of a local miss at the mobile computing device to the web service and a notification of a web service hit to the web service. Providing the notification of the local miss may inform a decision by the web service to push content to the mobile device or to other devices. Providing the notification of the web service hit may inform a decision by the web service concerning pre-fetching related content. The web service hit notification may also inform future decisions about pre-fetching the accessed content.

Upon determining that the content item is not available on the mobile from the first content data store and upon determining that the content item is not available at the web service from the second content data store, and upon determining that the content item is available from an origin server, method 300 may then proceed, at 360 to access the content item from the origin server. Once the content item has been acquired, method 300 may, at 362, provide the fingerprint to the web service, and, at 364, provide a notification of a local miss at the mobile computing device and a notification of a web service miss to the web service. Once again, providing the notifications may cause the web service to push certain content to the mobile device or to other devices or users. Additionally, providing the notifications may allow the web service to update its approach for pre-fetching certain related content based on observations about acquisitions, hits, and misses.

Method 300 may also include, at 370, selectively providing fingerprints from the mobile computing device to the web service. The fingerprints identify content items that are currently available in the first content data store on the mobile device. Similarly, method 300 may include, at 380, selectively providing fingerprints from the web service to the mobile computing device. These fingerprints identify content items that are currently available in the second content data store associated with the web service. The actions at 370 and 380 may occur asynchronously, and thus may not be associated with a user requesting content or even with content being provided. The fingerprints may be provided in response to another event, at a scheduled time, at a random time, when an application is started or stopped, or in response to other actions. These actions share intelligence between co-operating devices or services to facilitate having content pre-fetched and available in local caches.

While actions 370 and 380 move fingerprints between the mobile computing device and a web service, actions 390 and 392 move content or fingerprints between related users or devices. Method 300 may include, at 390, selectively asynchronously providing the content item or fingerprint to another computing device associated with a user of the mobile computing device. For example, a user may have a smart phone, a laptop computer, a tablet computer, and a personal computer. When content or a fingerprint is provided to one device, the content or fingerprint may be provided to all the devices to make the user's browsing experience seamless between devices. Method 300 may also include, at 392, selectively asynchronously providing the content item or fingerprint to another user associated with the user of the mobile computing device. For example, the user may have a circle of friends on a social network. This circle of friends may be organized around a sports team. Thus, when a member of the circle of friends receives content or fingerprints related to the sports team, that content or fingerprint may be provided to other members of the circle. Actions 390 and 392 distribute content and fingerprints beyond just the mobile device and its user.

Figure 4:
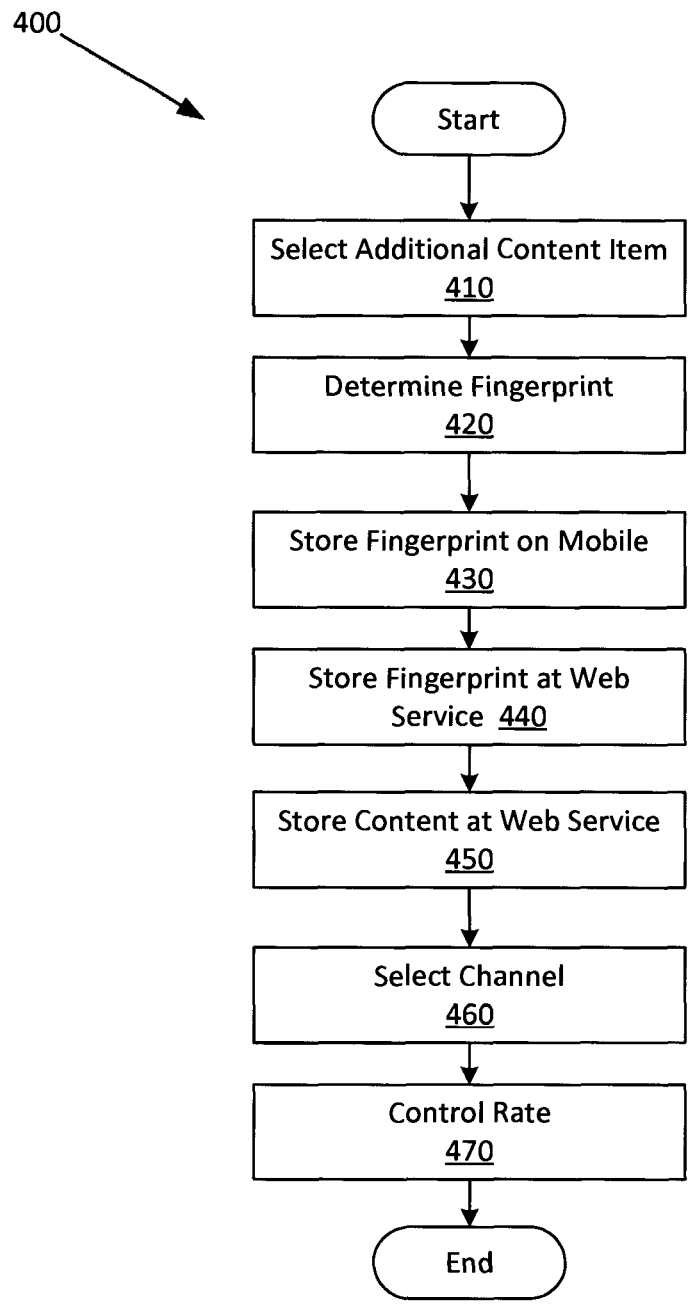
FIG. 4 illustrates an example method associated with fingerprint-based, intelligent, content pre-fetching.

FIG. 4 illustrates an example method 400 associated with selecting content to pre-fetch. Method 400 includes, at 410, controlling the web service to asynchronously provide to the mobile computing device an additional content item selected by the web service. In one example, the additional content item is selected by the web service as a function of a relationship between the content item and the additional content item. The relationship may be, for example, a link to the additional content item found in the content item, a common topic shared by the additional content item and the content item, a common author shared by the additional content item and the content item, a frequency with which the two items are viewed by others in a given period of time, or other relationships.

In another example, the additional content item may be selected by the web service as a function of an attribute of a user of the mobile computing device or as a function of an attribute of a user other than the user of the mobile computing device. The attributes may be, for example, a content acquisition history, a content acquisition pattern, a content acquisition location, a content acquisition time, or a content acquisition anomaly. The acquisition history may describe other content a user or group of users has accessed. The acquisition pattern may describe the order in which content is viewed. For example, certain users may access the front page of their favorite paper, then access the front page of the sports section, then may access a page concerning the local hockey team, and then may access a page by a beat writer for that hockey team. After checking the hockey, the user may then habitually look at pages associated with their stock portfolio and with certain business commentators. The user may then go to a crossword puzzle page for the remainder of a trip on the Long Island Rail Road. The acquisition location may describe content that is frequently accessed from a certain location. For example, when a user is standing in front of a certain store, the user may look for content concerning sales occurring in that store, or when a user is standing in front of a subway station, the user may look for content concerning the on time performance of that subway line. The acquisition time may describe content that a user typically looks for at a certain time of day. For example a user may frequently look for the weather first thing in the morning and may look for movie listings later in the evening.

In one embodiment, the additional content item may not be related to the content item. In this embodiment, the additional content item may be selected based on the agenda of someone other than the user of the mobile device. For example, the additional content item may be selected by the web service as a function of a targeted advertising policy. The targeted advertising policy may select the content item as a function of an attribute of a user of the mobile computing device, or an attribute of a user other than the user of the mobile computing device. For example, if the user is in a certain demographic (e.g., male, age 45-50) and is in a certain location (e.g., mall), the targeted advertising may provide a first ad (e.g., cigar store).

Once the additional content item has been selected, method 400 may proceed, at 420, by determining a fingerprint for the additional content item and, at 430, by storing the fingerprint for the additional content item in the fingerprint data store. Method 400 may also include, at 440, storing the fingerprint at the web service and, at 450, storing the additional content item in the second content data store.

Method 400 may also include, at 460, controlling the web service to select a communication method over which the additional content items are to be provided to the mobile computing device. The communication method may be selected based, at least in part, on a cost associated with the communication method. For example, a Wi-Fi channel that is less expensive than a cellular channel may be available and thus the Wi-Fi channel may be chosen. With a lower cost, and higher bandwidth channel available, pre-fetching may proceed at a more aggressive rate than if only a higher cost or lower bandwidth channel was available.

Method 400 may also include, at 470, controlling the web service to provide additional content items to the mobile computing device at a specific rate. The rate may be determined by different factors. For example, the rate may be based on a battery charge level on the mobile computing device, on a cost of providing additional content items, on a preference of a user of the mobile computing device, or on a location of the mobile computing device.

While FIGS. 3 and 4 illustrate various actions occurring in serial, it is to be appreciated that various actions illustrated in FIGS. 3 and 4 could occur substantially in parallel. By way of illustration, a first process could select content, a second process could manage fingerprint data stores, a third process could manage content data stores, and a fourth process could control communication channels and rates. While four processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 300 or 400. While executable instructions associated with the above methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals per se. A computer-readable storage medium may take forms, including, but not limited to, non-volatile media, and volatile media. Non-volatile media may include, for example, optical disks, magnetic disks, tapes, flash memory, read only memory (ROM), and other media. Volatile media may include, for example, semiconductor memories, dynamic memory (e.g., dynamic random access memory (DRAM), synchronous DRAM (SDRAM), double data rate SDRAM (DDR SDRAM), etc.), and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 5:
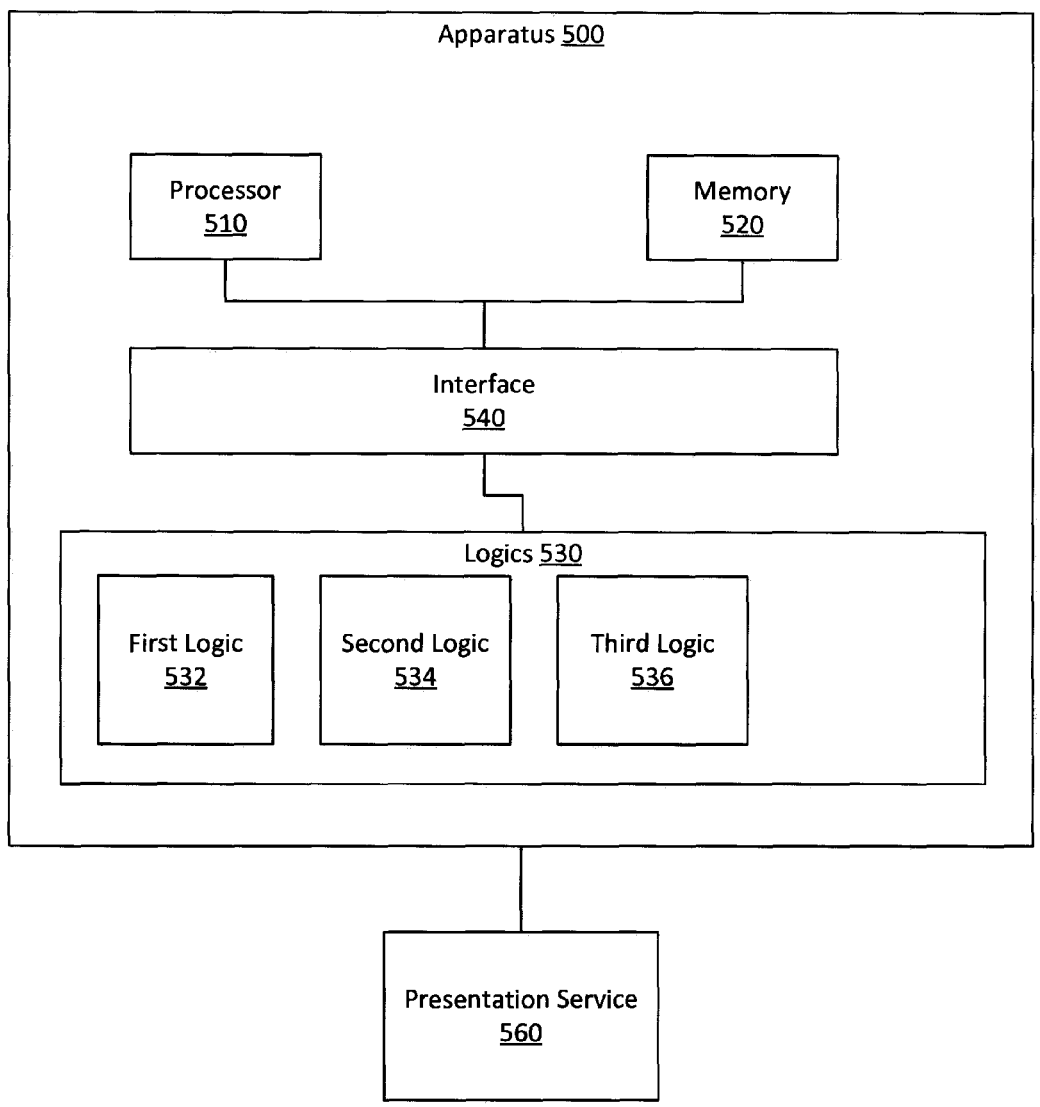
FIG. 5 illustrates an example apparatus configured to support fingerprint-based, intelligent, content pre-fetching.

FIG. 5 illustrates an apparatus 500 that includes a processor 510, a memory 520, a set 530 of logics, and an interface 540 that connects the processor 510, the memory 520, and the set 530 of logics. The memory 520 may be configured to store content items or fingerprints derived from content items. The content items are predictively pre-fetched by the apparatus 500.

The set 530 of logics may be configured to selectively intelligently pre-fetch content. Apparatus 500 may be, for example, a computer, a laptop computer, a tablet computer, a personal electronic device, a smart phone, SoC, or other device that can access and process data. In one embodiment, the apparatus 500 may be a general purpose computer that has been transformed into a special purpose computer through the inclusion of the set 530 of logics. The set 530 of logics may be configured to selectively asynchronously provide a content item or a fingerprint derived from the content item to a data store on a mobile computing device in response to an event other than a request for content from the mobile computing device. Apparatus 500 may interact with other apparatus, processes, and services through, for example, a computer network.

The set 530 of logics may include a first logic 532 that is configured to select the content item. In one embodiment, the first logic 532 may be configured to select the content item as a function of an attribute of a user of the mobile device or as an attribute of a user of a different mobile device. The attributes may include, but are not limited to, a content acquisition history, a content acquisition pattern, a content acquisition location, a content acquisition time, or a content acquisition anomaly. The content acquisition history may include fingerprints of content that was acquired by the user or by users related to the user (e.g., family, social network, co-workers, users with similar demographics). The attributes also include richer information that can provide deeper intelligence. For example, not only can the selection be made based on what a user has seen in the past, but the selection can be made based on when they viewed selected content, where they viewed selected content, the order in which content was viewed, and other factors. These attributes may be analyzed from the point of view of the user or of other correlated users. Additionally, a selection may be made based on anomalous behavior. If a user routinely views a small set of content, but then anomalously views something outside their regular set of data, then connections between the anomaly and the set may be analyzed to predict additional apparently anomalous content to pre-fetch.

The first logic 532 may also be configured to select the content item according to a targeted advertising method. The targeting may be based on content viewed by the user, where the user is located, what the user is doing, with whom the user is interacting, and other factors.

The set 530 of logics may also include a second logic 534 that is configured to provide the content item or the fingerprint to the mobile device. The content item may be provided over different communication channels at different times. In one embodiment, the second logic 534 may be configured to control the rate at which content items or fingerprints are provided to the mobile device. The rate may be a function of different factors. For example, the rate may be a function of which communication channels (e.g., Wi-Fi, Ethernet, Cellular) are available for communicating with the mobile device and a property (e.g., cost, bandwidth) of the communication channel(s). For example, if a high-speed, low-cost channel is available, then pre-fetching may proceed at a high rate. But if only a low-speed, high-cost channel is available, then pre-fetching may be slowed or even halted. The rate may also be a function of a battery level on the mobile device. For example, if there is adequate battery charge remaining, then pre-fetching may continue while if there is inadequate battery charge remaining, then pre-fetching may be halted. The rate may also be a function of an attribute of a user of the mobile device, an attribute of the mobile device, or a user preference. For example, the user may have established a preference for a level of pre-fetching or the user may only rarely, if ever, view pre-fetched content. In this example, pre-fetching may be reduced or halted.

The set 530 of logics may also include a third logic 536 that is configured to update the memory 520 with the content item or the fingerprint. In one embodiment, the third logic 536 may be configured to provide the content or the fingerprint to a device other than the mobile device. For example, the user of the mobile device may have other devices (e.g., laptop, personal computer, smart phone) and the content or fingerprint may be distributed to these devices.

The third logic 536 may also be configured to provide the content or the fingerprint to a user other than a user of the mobile device. For example, the user may belong to a social network and may have a circle of friends. In this case the content or fingerprint may be distributed to members of that circle of friends.

In different embodiments, some processing may be performed on the apparatus 500 and some processing may be performed by an external service or apparatus. Thus, in one embodiment, apparatus 500 may also include a communication circuit that is configured to communicate with an external source to facilitate displaying content or information about content. In one embodiment, the third logic 536 may interact with a presentation service 560 to facilitate displaying data using different presentations for different devices. For example, content may be displayed in a first, fuller rendition on a first device with a higher graphics capability but may be displayed in a second, limited rendition on a second device with a lower graphics capability.

Figure 6:
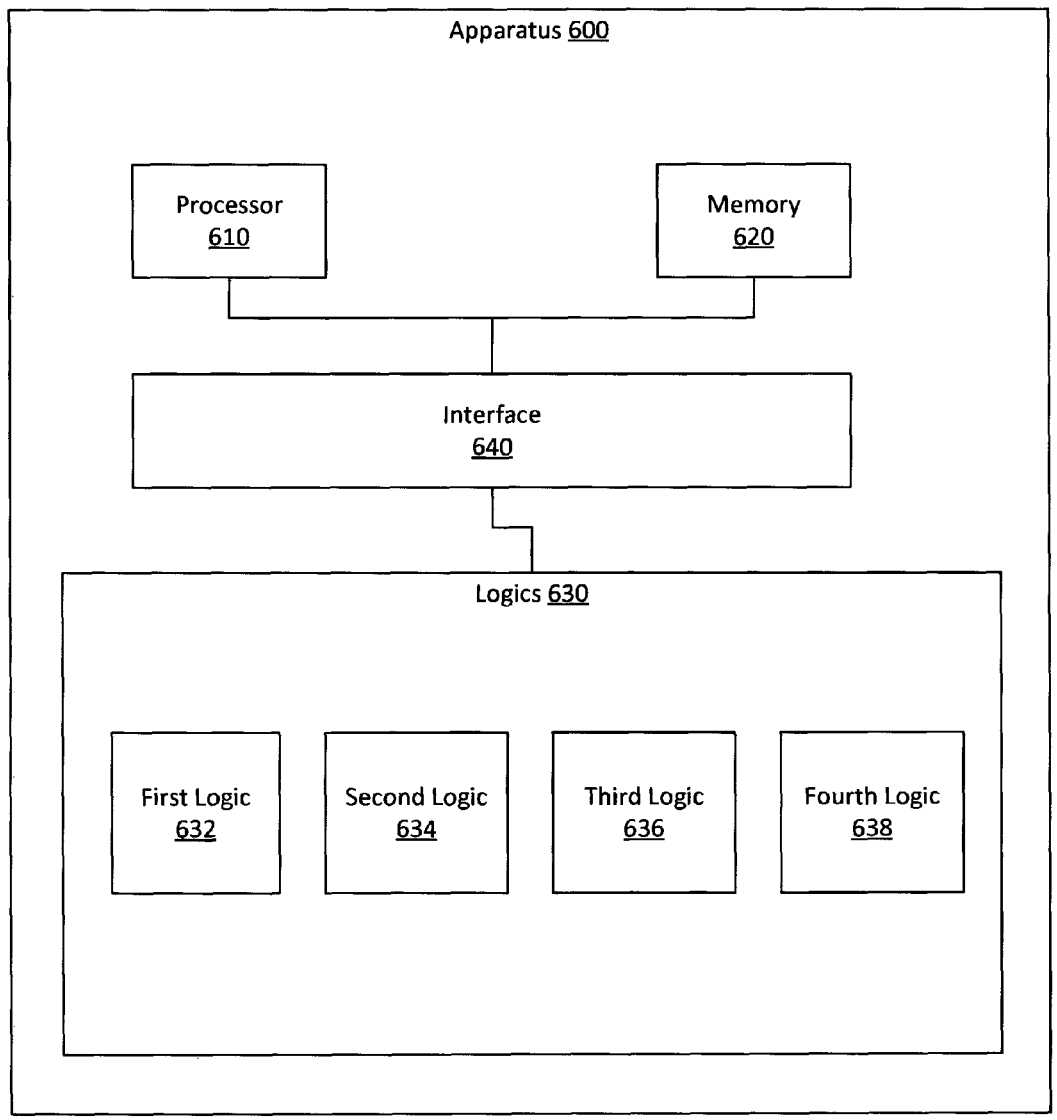
FIG. 6 illustrates an example apparatus configured to support fingerprint-based, intelligent, content pre-fetching.

FIG. 6 illustrates an apparatus 600 that is similar to apparatus 500 (FIG. 5). For example, apparatus 600 includes a processor 610, a memory 620, a set of logics 630 (e.g., 632, 634, 636) that correspond to the set of logics 530 (FIG. 5) and an interface 640. However, apparatus 600 includes an additional fourth logic 638. The fourth logic 638 may be configured to identify local content present on the mobile device that is not present in the memory 620. Once the fourth logic 638 has identified local content that is present in the mobile device but not present in the memory 620, the fourth logic 638 may acquire the local content. In different examples the local content may be acquired from the mobile device or from an origin server.

Once the fourth logic 638 has the local content, the fourth logic 638 may produce a fingerprint associated with the local content and store that fingerprint locally or provide that fingerprint to other devices or users. Fourth logic 638 may also selectively pre-fetch additional content or targeted advertising based, at least in part, on the local content.

Figure 7:
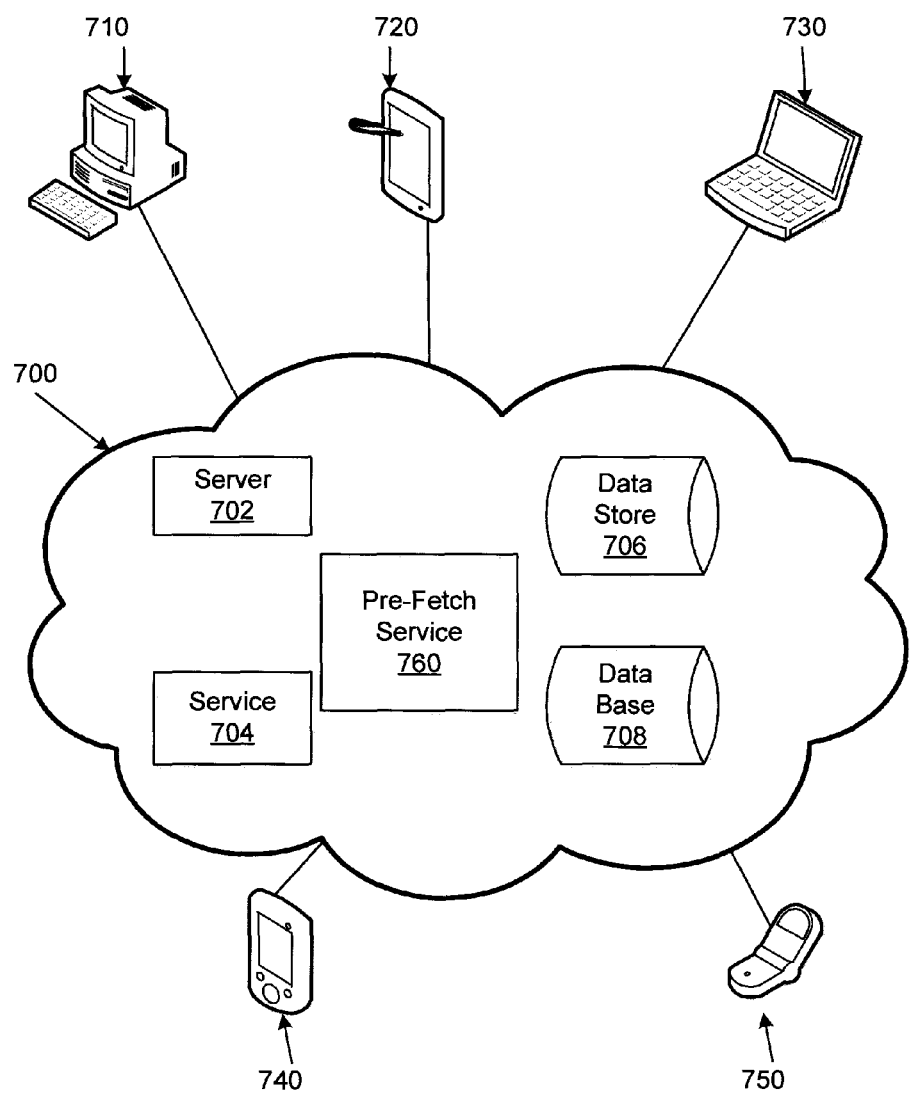
FIG. 7 illustrates an example cloud operating environment.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example pre-fetch service 760 residing in the cloud. The pre-fetch service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the pre-fetch service 760.

FIG. 7 illustrates various devices accessing the pre-fetch service 760 in the cloud. The devices include a computer 710, a tablet 720, a laptop computer 730, a personal digital assistant 740, and a mobile device (e.g., cellular phone, satellite phone, wearable computing device) 750. The pre-fetch service 760 may identify content to pre-fetch and provide it to one or more of the devices accessing pre-fetch service 760.

It is possible that different users at different locations using different devices may access the pre-fetch service 760 through different networks or interfaces. In one example, the pre-fetch service 760 may be accessed by a mobile device 750. In another example, portions of pre-fetch service 760 may reside on a mobile device 750.

Figure 8:
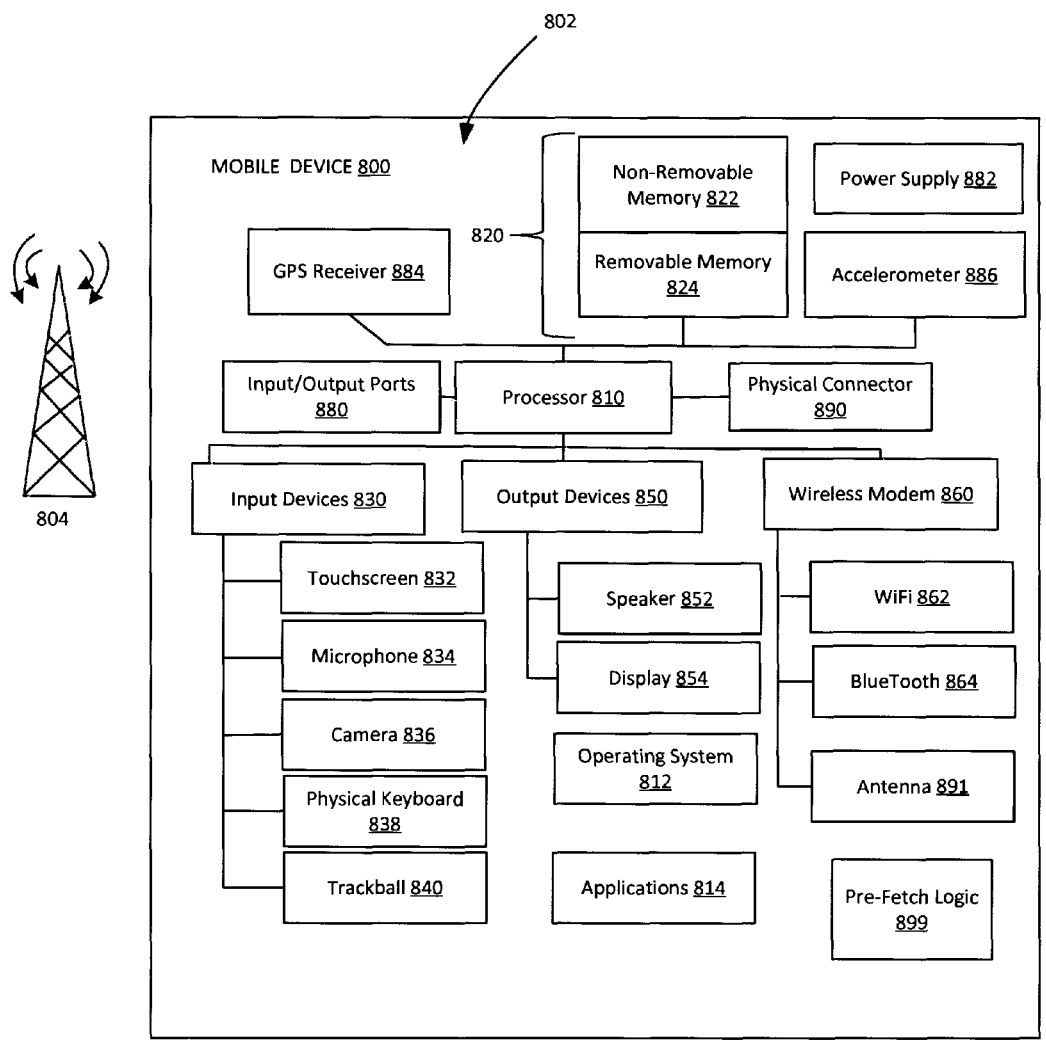
FIG. 8 is a system diagram depicting an exemplary mobile communication device configured to support fingerprint-based, intelligent, content pre-fetching.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, etc.) and may allow wireless two-way communications with one or more mobile communications networks 804, such as a cellular or satellite networks.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include mobile computing applications (e.g., email applications, calendars, contact managers, web browsers, messaging applications), or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include web pages, text, images, sound files, video data, or other data sets to be sent to or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to a gaming application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global System for Mobile Communications (GSM) network for data and voice communications within a single cellular network, between cellular networks, or between the mobile device and a public switched telephone network (PSTN).

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a pre-fetch logic 899 that is configured to provide a functionality for the mobile device 800. For example, pre-fetch logic 899 may provide a client for interacting with a service (e.g., service 760, FIG. 7). Portions of the example methods described herein may be performed by pre-fetch logic 899. Similarly, pre-fetch logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, and C, (e.g., the data store may store only A, only B, or only C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . ABB . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof including multiple instances of A, B, or C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   accessing a fingerprint for a content item to be accessed by a mobile computing device, where the fingerprint is an anonymous obfuscation of an identifier of the content item;
   accessing a fingerprint data store on the mobile computing device, where the fingerprint data store stores fingerprints associated with content items available from a first content data store on the mobile computing device, from a second content data store associated with a web service that provides a content pre-fetching service for the mobile computing device, and from an origin server;
   upon determining that the content item is available from the first content data store based, at least in part, on the fingerprint:
      accessing the content item from the first content data store; and
      providing the fingerprint and a notification of a local hit to the web service,
   upon determining that the content item is not available from the first content data store based, at least in part, on the fingerprint, and upon determining that the content item is available from the second content data store based, at least in part, on the fingerprint:
      accessing the content item from the second content data store;
      providing the fingerprint to the web service;
      providing a notification of a local miss at the mobile computing device to the web service, and
      providing a notification of a web service hit to the web service,
      and
   upon determining that the content item is not available from the first content data store based, at least in part, on the fingerprint, and upon determining that the content item is not available from the second content data store based, at least in part, on the fingerprint, and upon determining that the content item is available from an origin server:
      accessing the content item from the origin server;
      providing the fingerprint to the web service;
      providing a notification of a local miss at the mobile computing device to the web service, and
      providing a notification of a web service miss to the web service.

2. The method of claim 1, comprising generating the fingerprint in response to a request from the mobile computing device for the content item, where the fingerprint is a hash of:
   a uniform resource locator associated with the content item, a universal resource identifier associated with the content item, a globally unique identifier associated with the content item, a time to live associated with the content item, a size of the content item, an object type of the content item, a modification date of the content item, a creation date of the content item, or a language of the content item.

3. The method of claim 1, comprising selectively providing one or more fingerprints from the mobile computing device to the web service, where the one or more fingerprints identify one or more content items that are currently available in the first content data store.

4. The method of claim 1, comprising selectively providing one or more fingerprints from the web service to the mobile computing device, where the one or more fingerprints identify one or more content items that are currently available in the second content data store.

5. The method of claim 1, comprising selectively asynchronously providing the content item or fingerprint to another computing device associated with a user of the mobile computing device, or selectively asynchronously providing the content item or fingerprint to another user of associated with the user of the mobile computing device.

6. The method of claim 1, comprising:
controlling the web service to asynchronously provide to the mobile computing device an additional content item selected by the web service;
determining a fingerprint for the additional content item;
storing the fingerprint for the additional content item in the fingerprint data store;
storing the fingerprint at the web service, and
storing the additional content item in the second content data store.

7. The method of claim 6, where the additional content item is selected by the web service as a function of a relationship between the content item and the additional content item.

8. The method of claim 6, where the additional content item is selected by the web service as a function of an attribute of a user of the mobile computing device or as a function of an attribute of a user other than the user of the mobile computing device.

9. The method of claim 8, where the attribute of the user of the mobile computing device is a content acquisition history, a content acquisition pattern, a content acquisition location, a content acquisition time, or a content acquisition anomaly, and
where the attribute of the user other than the user of the mobile computing device is a content acquisition history, a content acquisition pattern, a content acquisition location, a content acquisition time, or a content acquisition anomaly.

10. The method of claim 6, comprising controlling the web service to provide additional content items to the mobile computing device at a rate determined by a battery charge level on the mobile computing device, by a cost of providing additional content items, by a preference of a user of the mobile computing device, or by a location of the mobile computing device.

11. The method of claim 6, comprising controlling the web service to select a communication method over which the additional content items are to be provided to the mobile computing device based, at least in part, on a cost associated with the communication method.

12. The method of claim 1, where the additional content item is not related to the content item.

13. The method of claim 12, where the additional content item is selected by the web service as a function of a targeted advertising policy, where the targeted advertising policy selects the content item as a function of an attribute of a user of the mobile computing device, or an attribute of a user other than the user of the mobile computing device.

14. A computer-readable storage medium storing computer-executable instructions that when executed by a computer control the computer to perform a method, the method comprising:
accessing a fingerprint for a content item to be accessed by a mobile computing device, where the fingerprint is an anonymous obfuscation of an identifier of the content item, and where the fingerprint was generated in response to a request from the mobile computing device for the content item, where the fingerprint is a hash of:
a uniform resource locator associated with the content item, a universal resource identifier associated with the content item, a globally unique identifier associated with the content item, a time to live associated with the content item, a size of the content item, an object type of the content item, a modification date of the content item, a creation date of the content item, or a language of the content item;
accessing a fingerprint data store on the mobile computing device, where the fingerprint data store stores fingerprints associated with content items available from a first content data store on the mobile computing device, from a second content data store associated with a web service that provides a content pre-fetching service for the mobile computing device, and from an origin server;
upon determining that the content item is available from the first content data store based, at least in part, on the fingerprint:
accessing the content item from the first content data store; and
providing the fingerprint and a notification of a local hit to the web service,
upon determining that the content item is not available from the first content data store based, at least in part, on the fingerprint, and upon determining that the content item is available from the second content data store based, at least in part, on the fingerprint:
accessing the content item from the first content data store;
providing the fingerprint to the web service;
providing a notification of a local miss at the mobile computing device to the web service, and
providing a notification of a web service hit to the web service,
upon determining that the content item is not available from the first content data store based, at least in part, on the fingerprint, and upon determining that the content item is not available from the second content data store based, at least in part, on the fingerprint, and upon determining that the content item is available from an origin server:
accessing the content item from the origin server;
providing the fingerprint to the web service;
providing a notification of a local miss at the mobile computing device to the web service, and
providing a notification of a web service miss to the web service,
selectively providing one or more fingerprints from the mobile computing device to the web service, where the one or more fingerprints identify one or more content items that are currently available in the first content data store;
selectively providing one or more fingerprints from the web service to the mobile computing device, where the one or more fingerprints identify one or more content items that are currently available in the second content data store;

selectively asynchronously providing the content item or the fingerprint to another computing device associated with a user of the mobile computing device;

selectively asynchronously providing the content item or the fingerprint to a user of a device other than the mobile computing device;

controlling the web service to asynchronously provide to the mobile computing device an additional content item selected by the web service,
  where the additional content item is selected by the web service as a function of a relationship between the content item and the additional content item, or as a function of an attribute of a user of the mobile computing device, or as a function of an attribute of a user other than the user of the mobile computing device, or as a function of a targeted advertising policy,
  where the targeted advertising policy selects the content item as a function of an attribute of a user of the mobile computing device, or an attribute of a user other than the user of the mobile computing device,
  where the attribute of the user of the mobile computing device is a content acquisition history, a content acquisition pattern, a content acquisition location, a content acquisition time, or a content acquisition anomaly, and
  where the attribute of the user other than the user of the mobile computing device is a content acquisition history, a content acquisition pattern, a content acquisition location, a content acquisition time, or a content acquisition anomaly;

determining a fingerprint for the additional content item;

storing the fingerprint for the additional content item in the fingerprint store;

controlling the web service to select a communication method over which additional content items are to be provided to the mobile computing device based, at least in part, on a cost associated with the communication method, and controlling the web service to provide the additional content items to the mobile computing device using the communication method at a rate determined by:
  a battery charge level on the mobile computing device,
  a cost of providing the additional content items,
  a preference of a user of the mobile computing device, or
  a location of the mobile computing device.

15. An apparatus, comprising:

a processor;

a memory configured to store content items or fingerprints derived from content items, where the content items are predictively pre-fetched by the apparatus;

a set of logics configured to selectively asynchronously provide a content item or a fingerprint derived from the content item to a data store on a mobile computing device in response to an event other than a request for content from the mobile computing device; and an interface to connect the processor, the memory, and the set of logics;

the set of logics comprising:
  a first logic configured to select the content item;
  a second logic configured to provide the content item or the fingerprint to the mobile device; and
  a third logic configured to update the memory with the content item or the fingerprint,
  where the second logic, upon determining that the content item is available from the data store on the mobile computing device based, at least in part, on the fingerprint, accesses the content item from the content data store on the mobile computing device and provides the fingerprint and a notification of a local hit to a web service,
  where the second logic, upon determining that the content item is not available from the content data store on the mobile computing device based, at least in part, on the fingerprint, and upon determining that the content item is available from a second content data store located off the mobile computing device based, at least in part, on the fingerprint, accesses the content item from the second content data store, provides the fingerprint to the web service, provides a notification of a local miss at the mobile computing device to the web service, and provides a notification of a web service hit to the web service, and
  where the second logic, upon determining that the content item is not available from the content data store on the mile computing device based, at least in part, on the fingerprint, and upon determining that the content item is not available from the second content data store based, at least in part, on the fingerprint, and upon determining that the content item is available from an origin server, accesses the content item from the origin server, provides the fingerprint to the web service, provides a notification of a local miss at the mobile computing device to the web service, and provides a notification of a web service miss to the web service.

16. The apparatus of claim 15, the first logic being configured to select the content item as a function of an attribute of a user of the mobile device or as an attribute of a user of a different mobile device,
  where the attribute is a content acquisition history, a content acquisition pattern, a content acquisition location, a content acquisition time, or a content acquisition anomaly.

17. The apparatus of claim 15, the first logic being configured to select the content item according to a targeted advertising method.

18. The apparatus of claim 15, the second logic being configured to control the rate at which content items or fingerprints are provided to the mobile device, where the rate is a function of an availability of a communication channel for communicating with the mobile device, a property of the communication channel, a battery level on the mobile device, an attribute of a user of the mobile device, an attribute of the mobile device, or a user preference.

19. The apparatus of claim 15, the third logic being configured:
  to provide the content or the fingerprint to a device other than the mobile device, and
  to provide the content or the fingerprint to a user other than a user of the mobile device.

20. The apparatus of claim 15, comprising:
a fourth logic configured:
  to identify local content present on the mobile device that is not present in the memory;
  to acquire the local content;
  to produce a fingerprint associated with the local content, and
  to selectively pre-fetch additional content or targeted advertising based, at least in part, on the local content.

* * * * *